(12) United States Patent
Sikora et al.

(10) Patent No.: US 7,259,873 B2
(45) Date of Patent: Aug. 21, 2007

(54) METHOD FOR MEASURING THE DIMENSION OF A NON-CIRCULAR CROSS-SECTION OF AN ELONGATED ARTICLE IN PARTICULAR OF A FLAT CABLE OR A SECTOR CABLE

(75) Inventors: Harald Sikora, Bremen (DE); Werner Blohm, Misselwarden (DE)

(73) Assignee: Sikora, AG, Bremen (DE)

( * ) Notice: Subject to any disclaimer, the term of this patent is extended or adjusted under 35 U.S.C. 154(b) by 0 days.

(21) Appl. No.: 11/087,239

(22) Filed: Mar. 23, 2005

(65) Prior Publication Data

US 2005/0213113 A1    Sep. 29, 2005

(30) Foreign Application Priority Data

Mar. 25, 2004  (DE)  ............ 10 2004 015 785

(51) Int. Cl.
*G01B 11/04* (2006.01)
*G01N 21/86* (2006.01)

(52) U.S. Cl. .................. 356/638; 356/625; 356/640; 250/559.24

(58) Field of Classification Search ........ 356/614–625, 356/635, 638, 639–640; 250/559.12, 559.13, 250/559.23, 208.1; 425/113
See application file for complete search history.

(56) References Cited

U.S. PATENT DOCUMENTS

| | | | | |
|---|---|---|---|---|
| 4,086,044 A | * | 4/1978 | Sikora | ............. 425/113 |
| 4,854,707 A | * | 8/1989 | Ring et al. | ............. 356/496 |
| 4,880,991 A | * | 11/1989 | Boehnlein et al. | ..... 250/559.24 |
| 4,931,658 A | * | 6/1990 | Tole | ............. 250/559.24 |
| 4,978,223 A | * | 12/1990 | Kutchenriter et al. | ........ 356/638 |
| 5,028,798 A | * | 7/1991 | Biswas et al. | ......... 250/559.21 |
| 5,094,600 A | * | 3/1992 | Sikora | ............. 425/113 |
| 5,383,022 A | * | 1/1995 | Kaser | ............. 356/640 |
| 5,457,537 A | * | 10/1995 | Richter | ............. 356/625 |
| 5,818,594 A | * | 10/1998 | Lukander | ............. 356/612 |
| 6,455,835 B1 | * | 9/2002 | Bernardini et al. | ...... 250/208.1 |
| 6,922,254 B2 | * | 7/2005 | Blohm et al. | ............. 356/638 |

FOREIGN PATENT DOCUMENTS

DE    197 57 067    3/2002

* cited by examiner

*Primary Examiner*—Sang H. Nguyen
(74) *Attorney, Agent, or Firm*—Vidas, Arrett & Steinkraus, P.A.

(57) ABSTRACT

Method for measuring the cross-sectional dimension of an elongated profile having rounded or sharp edges, in particular of a flat or sector cable by illuminating the article with light sources and determination of a plurality of shadow borders and calculating the parameter of the circle from the coordinates of the light sources and the shadow borders. The dimensions are determined from the circular parameter.

20 Claims, 4 Drawing Sheets

METHOD FOR MEASURING THE DIMENSION OF A NON-CIRCULAR CROSS-SECTION OF AN ELONGATED ARTICLE IN PARTICULAR OF A FLAT CABLE OR A SECTOR CABLE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Flat cables are used with various structures. A frequent use is an insulated double conductor, with both conductors or wires mechanically connected through their insulation and a web there between. In cross-section such a double wire forms an eight. It is also known to provide one wire with a smaller diameter than the other. In these or similar flat cables the smaller side in cross-section is circular or elliptical. It is further known to provide a flat cable with a rectangular cross-section with non-rounded, circularly or elliptically rounded edges or corners.

Sector cables are single wires for multiple wire cables and usually have a sector angle of 90° or 120°. The outer side of the sector cable is circular in cross-section, and the sides which intersect in the centre of the circle are rounded in the section area. Thus, two opposed circular sections exist, having different radii.

It is a necessity to control the dimensions of such profiles during manufacture in order to achieve constant desired sizes or dimensions. It is known to illuminate articles of the kind mentioned transverse to their longitudinal axis, preferably by parallel rays and to determine the shadow borders on a light sensitive sensor. In this method, it is necessary to precisely lead the articles with respect to their angular position. A certain rotation about the longitudinal axis results in failures of the measurement values. It is further disadvantageous that the generation of parallel rays by means of a collimator or the like results in measurement failures for inaccuracies of the optical system used. If an orthogonal measurement along two orthogonal axes is carried out, the danger exists that the sensor or the light source beneath the article suffers from contamination.

In this connection, it has been further become known to rotate the article about the longitudinal axis in an oscillating manner and to determine the minimum and the maximum values. This method leads to improved measurement values, however, necessitates a continuous partial rotation of the article.

From DE 197 57 067 C2 a method for measuring the diameter of thin cables has become known wherein the cable is illuminated by a fan-shaped beam of a monochromatic point-shaped light source in a measuring plane, with the main beam direction being approximately perpendicular to the axis of the cable. The light is received by means of a light sensitive line sensor on the opposite side of the cable with the axis of the sensor approximately being perpendicular to the main beam direction. The diameter of the cable is determined by evaluating the intensity curves of the diffraction pattern at the edges of the shadow caused by the article under consideration of the measured distance between the article and the sensor.

It is an object of the invention to provide a method to determine a dimension of an article, in particular of a flat cable or a sector cable, which independent of the rotational position of the article allows a relatively precise measurement.

BRIEF SUMMARY OF THE INVENTION

In the method of claim 1 it is assumed that the article, in particular a flat cable, has sides or edges in cross-section which are circular or elliptical. In the method according to the invention circular sections or elliptical sections of the article are illuminated by light sources under different directions, with the main beam direction is approximately in a plane perpendicular to the longitudinal axis of the article. At least three different peripheral rays per circular section or at least four different peripheral rays per elliptical section are generated. By means of at least one light sensitive sensor having position resolution capability the shadow borders on the sensor are determined which are caused by the circular or elliptical section. The function of three tangents on the circular section or of four tangents on the elliptical section are determined from the position of the borders of the shadow and of the light sources in the measuring plane in view of a predetermined coordinate system in the measuring plane. The circle parameters (centre, radius) or those of the ellipse (centre, radii) are calculated from the tangent functions by known geometrical relations. For the elliptical section the smaller and the larger radius is calculated besides the centre.

By a suitable arrangement of the light sources in which for example a fan-shaped beam is emitted for each of the light sources a line ray or a peripheral ray is existing which is a tangent on the circular or elliptical section. With the known coordinates for the light sources and the shadow borders on the sensors in the measuring plane it is possible to determine the tangents in a predetermined coordinate system lying in the measuring plane. It is understood that the coordinates of the light sources are stored priority and that the coordinates of the impinging points or positions of the peripheral rays on the sensor can be easily determined. As known, the position of the centre and the radius of a circle can be determined if three tangents on the circle are known. For an ellipse four tangents are necessary in order to determine the centre and the smaller and the larger radius. If the centre and the radius are known, this results for example in the width and/or thickness of a flat cable, namely by the radii and the position of two centres or the radius if the smaller side of the cross-section is a circular section.

It should be noted that "positions on the circumference of the cross-section" means more or less significant changes of the direction of the periphery e.g. edges, arcs or the like which define the contour of the cross-section and which are to be determined with respect to their dimension. "Axes" means the straight line between the predetermined positions on the periphery.

The method according to the invention has the advantage that the dimension of the article can be sufficiently accurately measured also when the article is rotated in the measuring plane about its longitudinal axis between the limits of for example +/−15°. A particular guide for the article in the measuring device can be omitted.

Elongated articles mostly have rounded corners in cross-section also if having an edged cross-section contour. The roundness usually is circular or elliptical. The invention is also applicable to profiles of articles wherein the radius at the edges tends to zero (practically, a radius of zero can hardly be realized). The method described above is also applicable to a radius tending to zero. A simplification is achieved if with a very small radius of a corner or an edge, the edge can be assumed as geometrical edge or corner. In this case, in a modification of the method described the illumination of the elongated profile can be such that at least two different peripheral rays are generated per edge or corner. The function equations for the peripheral rays can be determined in the same manner as described above in that the impinging positions on the sensor are measured. The position of the corners are calculated from the coordinates of the impinging positions and of the light sources in the measuring plane by means of geometrical equations. Two peripheral rays which extend through a corner, form a point of intersection as known. This fact can be used for the calculation of both function equations for both peripheral rays.

If, however, the corners or edges of the cross-section of an elongated article are rounded, the invention described in the beginning can be used in that the circular or elliptical sections of the rounded corners are calculated in view of their centres and radii.

According to an embodiment of the invention, a plurality of groups of light sources is provided, each group being associated with a light sensitive position resolving sensor. By means of the groups of light sources corners, circular and elliptical sections of an article are illuminated, in particular of a flat cable. According to a further embodiment of the invention, the article is moved in the measuring area such that the transverse axis of the cross-section has an angle with respect to the measuring axis. For example for a flat profile e.g. a flat cable, the angle may be 45°. Light sources and position resolving sensor are located such that none of the components is located beneath the elongated profile. Otherwise, the danger exists that dropping contaminants disturb the light sources or the sensor, respectively. According to an embodiment of the invention, the determination of the shadow borders is carried out by evaluating the intensity courses of the diffraction pattern at the edges of the shadow caused by the edges of the cable as already described in DE 197 57 067 C2. It is also possible to directly determine the shadow borders by means of a high resolving line sensor.

Preferably, point-shaped light sources (laser diodes) are used as light sources. According to a further embodiment of the invention, optical systems between the object and the light source are not used. Optical systems mandatorily cause failures in particular if the object changes its position relative to the light source and/or the sensor. Failures are avoided if the object is directly illuminated without an optical system.

According to a further embodiment of the invention, surface or line sensors are used as position resolving sensors, in particular CCD- or CMOS-surface or line sensors.

If the elongated particle has an axially symmetric cross-section two different peripheral rays are sufficient for one circular section or three different rays for one elliptical section in order to determine the dimension of the cross-section of an elongated particle in the manner described above. From the symmetry of the cross-section to be measured auxiliary assumptions can be derived with respect to the position of the centres of the circular or elliptical sections and the size of the radii of the circular sections or the larger or the smaller radii of the elliptical sections to determine the missing unknown for the used equations.

The measured article, e.g. cable does not move through the measuring zone completely without transverse movement, rather has a transverse movement and a rotation and suffers also under high-frequent vibrations. Thus, the danger exists that during a measuring cycle the article changes its position. The reading time for line sensors of conventional structure e.g. CCD-lines is in a millisecond range. In order to avoid an overlapping on the line sensors, only one light source per time unit can illuminate the sensor line. Therefore, an embodiment of the invention provides that each sensor line is comprised of parallel sub-lines which are selectively sensitive for a spectral colour and the light sources emit light in a spectral colour. The lines for example can be used with suitable colour filters. By means of this method the light sources can be switched on contemporarily without an interference through an overlapping on the sensor.

In an alternative embodiment of the invention it is provided that three parallel sub-lines of the line sensor are provided with an electronically controlled shutter, with the actuation of the shutter being synchronized by a pulse control of the light sources such that the shutter opens for a short time in the cycles of the sequentially pulsed light sources. The control or triggering of the light sources can take place in a microsecond cycle. In this time duration the elongated article can be regarded practically as stationary. The reading-out of the line sensor can take place afterwards when all three sub-lines have been illuminated.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated

BRIEF DESCRIPTION OF SEVERAL VIEW OF THE DRAWINGS

The invention is subsequently described in more detail with respect to embodiments illustrated in accompanying drawings wherein FIG. 1 shows a cross-section of a flat cable in a coordinate system and illuminated by three point-shaped light sources e.g. laser diodes;

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
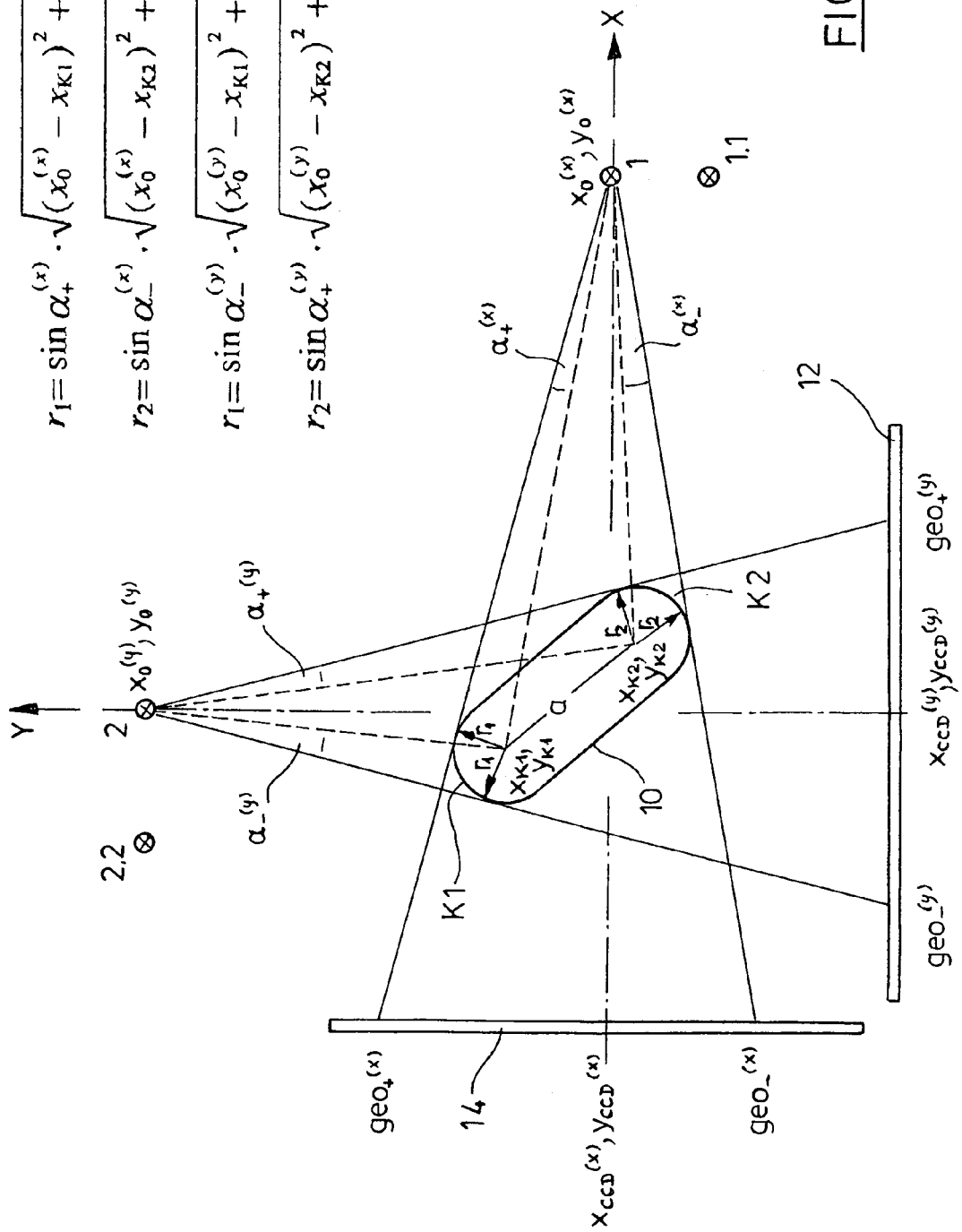

FIG. 1 shows the cross-section of a typical flat cable 10. The interior of the flat cable is not shown. It is of known structure. In cross-section the flat cable has parallel longer sides and circular smaller sides, with the smaller sides being designated by the circles K1 and K2. The centres of the circles K1 and K2 are designated with the coordinates $X_{k1}$, $Y_{k1}$ or $X_{k2}$, $Y_{k2}$. The radii of the circles K1 and K2 are designated with r. The X-Y-coordinate system forms a measurement plane, wherein four point-shaped light sources 1, 2, 1.1 and 2.2 are arranged. The light sources are preferably monochromatic, however, this is not decisive. The point-shape in any case must be in the measurement plane or the coordinate system plane, respectively. In the direction perpendicular to the drawing or the measurement plane the laser light sources may linearly extend. Suitable laser diodes for example are used for the light sources. In the shown system, the coordinates of the light sources are known. Light source 2.1 lies within the first quadrant and the light source 1.1 in the fourth quadrant. The light sources 2 and 2.2 or 1 and 1.1 are pairwisely arranged so that sections of the circles K1 and K2 are illuminated. The emission of the point-shaped light sources is fan-shaped, and a line ray or a peripheral ray can be assumed on the circle K1 and K2. This peripheral ray is one which is not masked by the cable 10. A CCD or CMOS line sensor 12 or a light sensitive linear line sensor is located on the side of cable 10 opposite to light sources 1 and 1.1. Correspondingly a further line sensor 14 or a light sensitive sensor line is located opposite to the light sources 2 and 2.1. With respect to light sources 1 and 1.1 four shadow borders result on line sensor 1 and with respect to light sources 2 and 2.4 four shadow borders on line sensor 2. The coordinates of the light sources 1, 1.1, 2 and 2.2 in the coordinate system are known. The coordinates of the impinging positions of the peripheral rays or of the shadow borders can be easily determined if the extension of the sensor lines in the coordinate system is known. The connection line between laser sources 2 and 2.2 or 1 and 1.1 is approximately parallel to the associated line sensor 12 or 14. The main beam direction of the light sources is approximately perpendicular to the associated line sensor 12 or 14, respectively. The axes of the line sensors are approximately perpendicular to each other.

In order to determine the four coordinates of both circular centres (X, Y) and both radii (r) of circles K1 and K2 six equations are necessary. Through the geometrical relations of the peripheral rays illustrated in FIG. 1 four equations can be constituted which are indicated in FIG. 1. Four further equations result from the peripheral rays in an analogous manner which emit from the light sources 1.1 and 2.2. The six unknown quantities of the circles K1 and K2 (coordinates of the centres and the radii) can be uniquely determined from six of the present eight equations.

The thickness of cable 10 results from the calculation of the radii $r_1$ and $r_2$ in the each position by $2r_1$ or $2r_2$. If as indicated in FIG. 1 both centres are determined also the width of the flat cable 10 can be determined since it results from the radii $r_1+r_2$ and the distance a of the centres.

Figure 2:
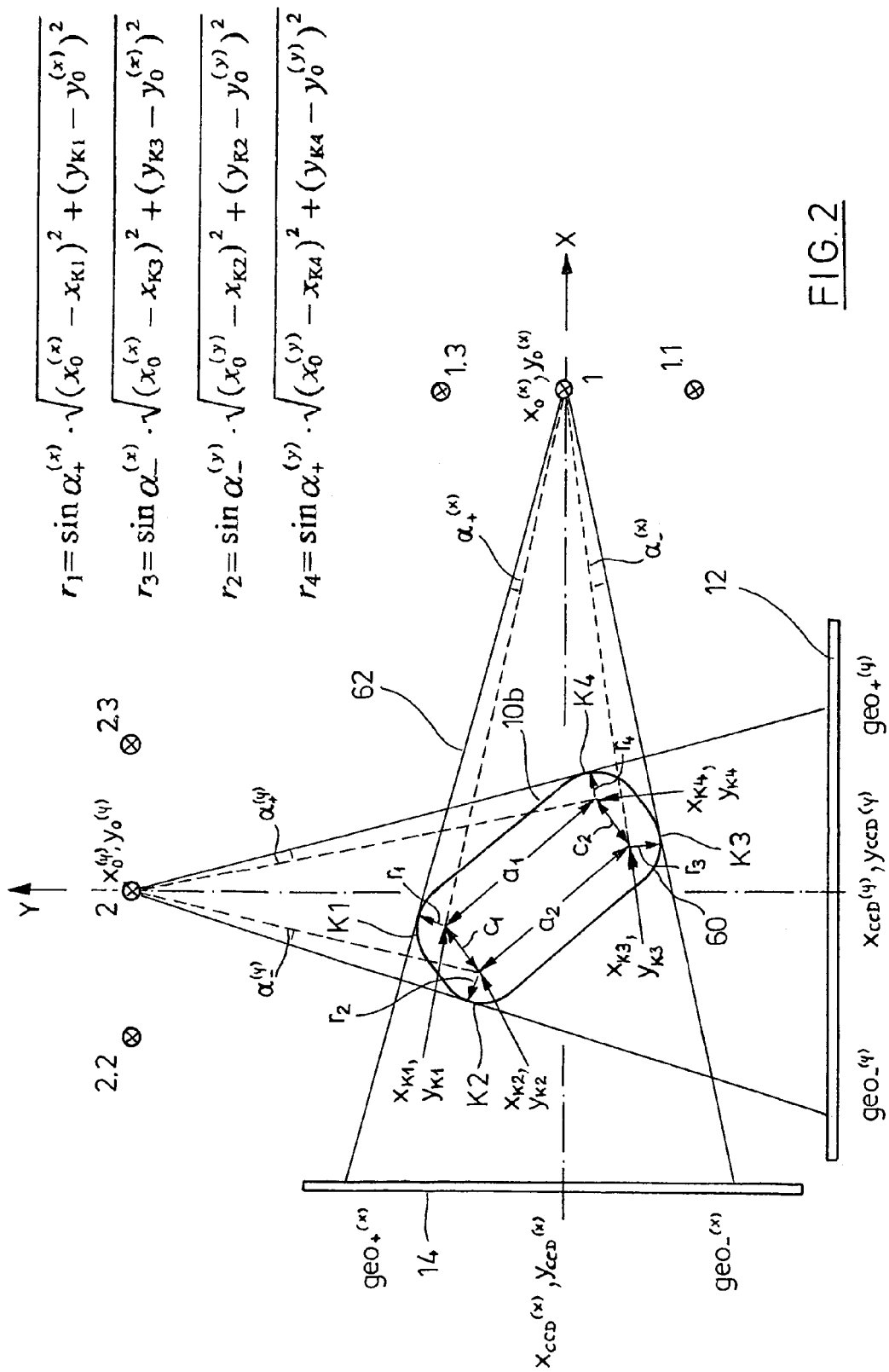
FIG. 2 shows a rectangular cross-section of for example a flat cable rounded at the edges.

FIG. 2 shows in cross-section a flat cable 10b which has an essentially rectangular cross-section with the edges being circularly rounded as indicated at 60. The circular sections have the centres $X_{k1}$, $Y_{k1}$ to $X_{k4}$, $Y_{k4}$, and the centres have the distances $a_1$ and $a_2$ or $c_1$ and $c_2$. The positions of the centres and the associated radii of the circular sections can be determined in a manner described in connection with FIG. 1 in order to determine the thickness and the width of the flat cable 10b as well. The thickness results from $a_1$ or $a_2$ plus the radii of the associated circular sections. The width results from $c_1$ or $c_2$ and the radii of the associated circular sections. For the determination of these data for each circular section the calculation of two or three tangents in the manner described above, is necessary.

In order to determine the eight coordinates of the four circle centres (X, Y) and the four radii (r) of the circles K1 to K4 twelve equations are necessary. From the peripheral rays shown in FIG. 2 four equations through geometrical relations can be established which are indicated in FIG. 2. Four further equations yield in an analogous manner of the peripheral rays which are emitted by light sources 1.1 and 2.2. Four further equations in an analogous manner yield from the peripheral rays which are emitted from light sources 1.3 and 2.3. The twelve unknown quantities of the circles K1 to K4 (coordinates of the centres and their radii) can be uniquely determined by the twelve equations.

The measuring principle shown in FIG. 2 can be applied also to unsymmetrical cross-sections of an elongated article. If, however, as shown in FIG. 2, the cross-sectional profile is axially symmetric, the generation of two peripheral rays per circular section is sufficient. By means of the impinging positions of the peripheral rays, eight equations can be established according to the principle described above. The remaining quantities result from auxiliary assumptions by which the remaining equations can be established. For example, in FIG. 2 the radius r is equal for all circular sections.

Figure 3:
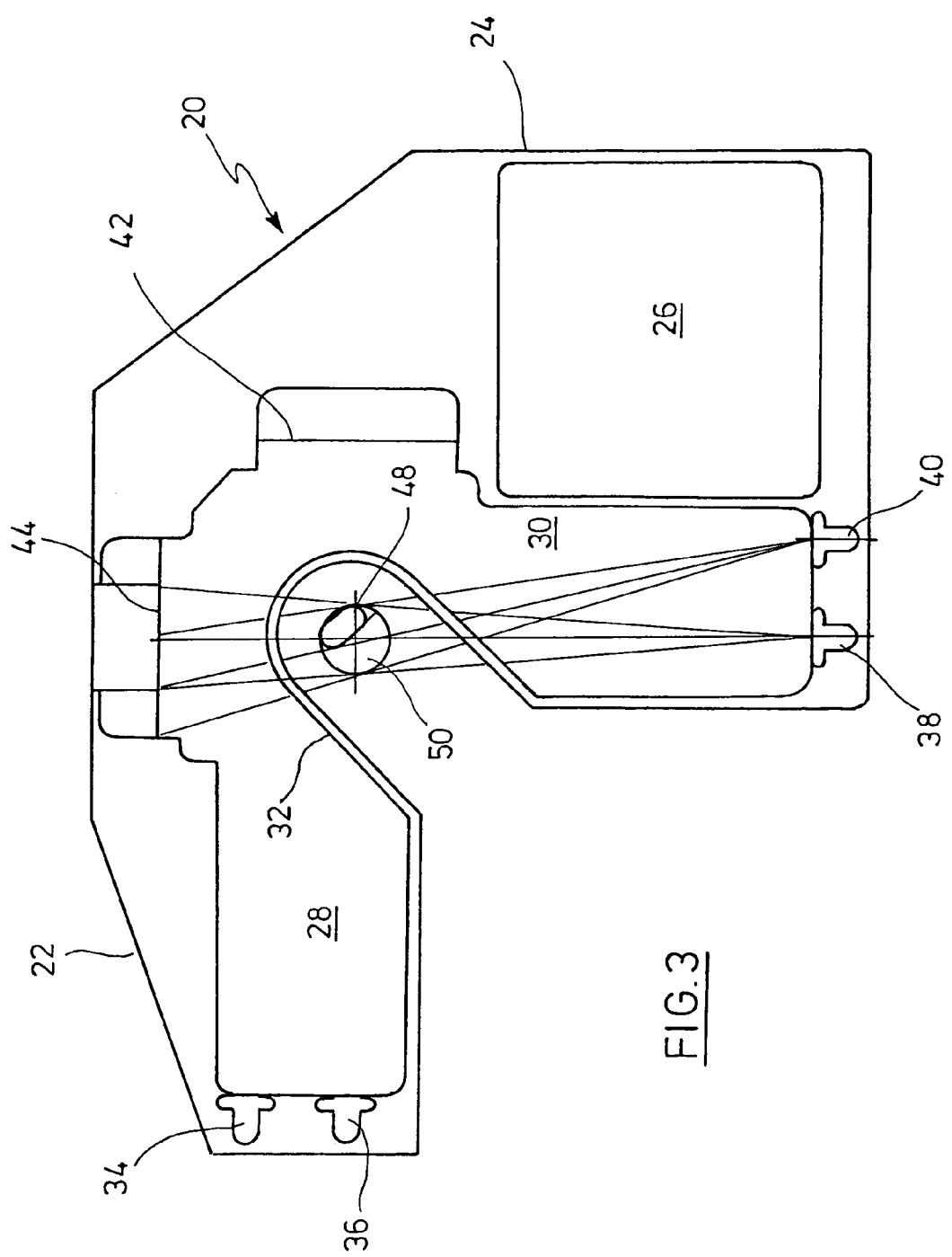
FIG. 3 shows a more concrete embodiment of the arrangement of FIGS. 1 and 2.

FIG. 3 shows diagrammatically the realisation of a measuring device embodying the principle illustrated in FIGS. 1 and 2. A flat angular retainer 20 has two legs 22, 24. The retainer 20 in leg 24 has a portion 26 wherein the electronic control for the measuring device is accommodated. Within the retainer 20 an angular recess is provided in legs 28 and 30 which is narrowed in the apex area by a projection 32 extending obliquely upwardly. The projection 32 has a slot for a purpose to be described below. Two laser diodes 34, 36 are located at the end of leg 22. The main beam directions of the laser diodes are parallel and parallel to the axes of leg 22. Two laser diodes 38, 40 are arranged at the end of leg 24, the main directions thereof being parallel and parallel to the longitudinal axis of leg 24. On the side of projection 32 opposite to laser diodes 34, 36 a CCD line sensor 42 is provided. On the side of projection 32 opposite to laser diodes 38, 40 a CCD-sensor line 44 is located on retainer 20. The longitudinal direction of the sensors is perpendicular to the main beam direction of the associated laser diodes 34, 36 or 38, 40, respectively. The readout electronic is arranged in portion 26.

A flat cable 48 can be seen in FIG. 3 in cross-section which is moved within the hollow projection 32 in its longitudinal direction. The flat cable 48 extends with its longitudinal axis perpendicular to the drawing plane or the plane of retainer 20. The flat cable has a cross-section similar to the flat cable of FIG. 1 and the transverse axis of the cross-section defines an angle of approximately 45° with respect to the main beam directions of the diodes 34, 36 or 38, 40, respectively. In FIG. 3 further a cable 50 having a circular cross-section is shown.

In FIG. 3 the laser diodes 38, 40 are activated and illuminate flat cable 48. A respective masking occurs on CCD sensor line 44, and it is possible through the determination of the shadow borders from the diffraction pattern to determine precise values. With the laser diodes 38, 40 each two shadow borders can be generated on sensor line 44. With respect to a circular section of the cross-section of the flat cable 48 two peripheral rays can be determined. For the measurement a third peripheral ray is necessary to activate laser diodes 34 or 36, respectively as already explained with respect to FIG. 1. Since normally the width of the flat cable is to be determined it is necessary to activate all laser diodes 34 to 40 in order to determine the position of the centres and radii of both circular sections. This does not require that the cable when being moved, maintains a predetermined position relative to retainer 20, in particular a predetermined rotary position about its longitudinal axis if the measurement is rapidly carried out. Flat cable 48 can be twisted by an angle of +/−15° without affecting the accuracy of the measurement.

The activation of all the laser diodes cannot be contemporarily without particular provisions since otherwise an overlapping of the beams on the sensor lines would occur. However, it is possible to time pulse the laser diodes 34 to 80 in a microsecond range. Within this short time duration, the flat cable 48 can be regarded as stationary. Movements of the flat cable, thus, do not lead to measurement failures. The measurement arrangement shown can be also used to measure a so-called round cable i.e. to measure their diameter. The method used corresponds for example to that disclosed in DE 197 57 067 C1 and requires only the activation of one laser diode of a pair of laser diodes of FIG. 3 for a measurement along two orthogonal axes. Appropriately diode 36 and 38 are used having a main beam direction perpendicular to the longitudinal axes of cable 50. A measurement of the tangents to determine the centre in the radius of the circle is not necessary for the diameter measurement of cable 50.

Figure 5:
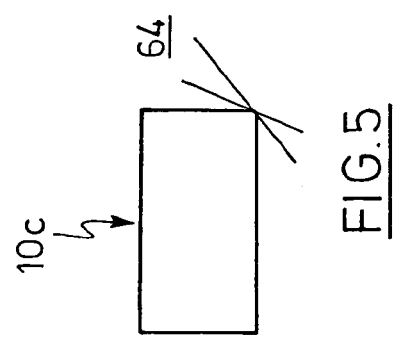

In FIG. 5 an rectangular profile of an elongated article is illustrated. It represents a particular case of the cross-section of FIG. 2 where the radii are zero or tend towards zero. If the illumination is such that each two peripheral rays form a corner, then the coordinates of the corners can be calculated by two peripheral rays which intersect in the edges. In FIG. 5 only two peripheral rays are shown at 64.

Figure 4:
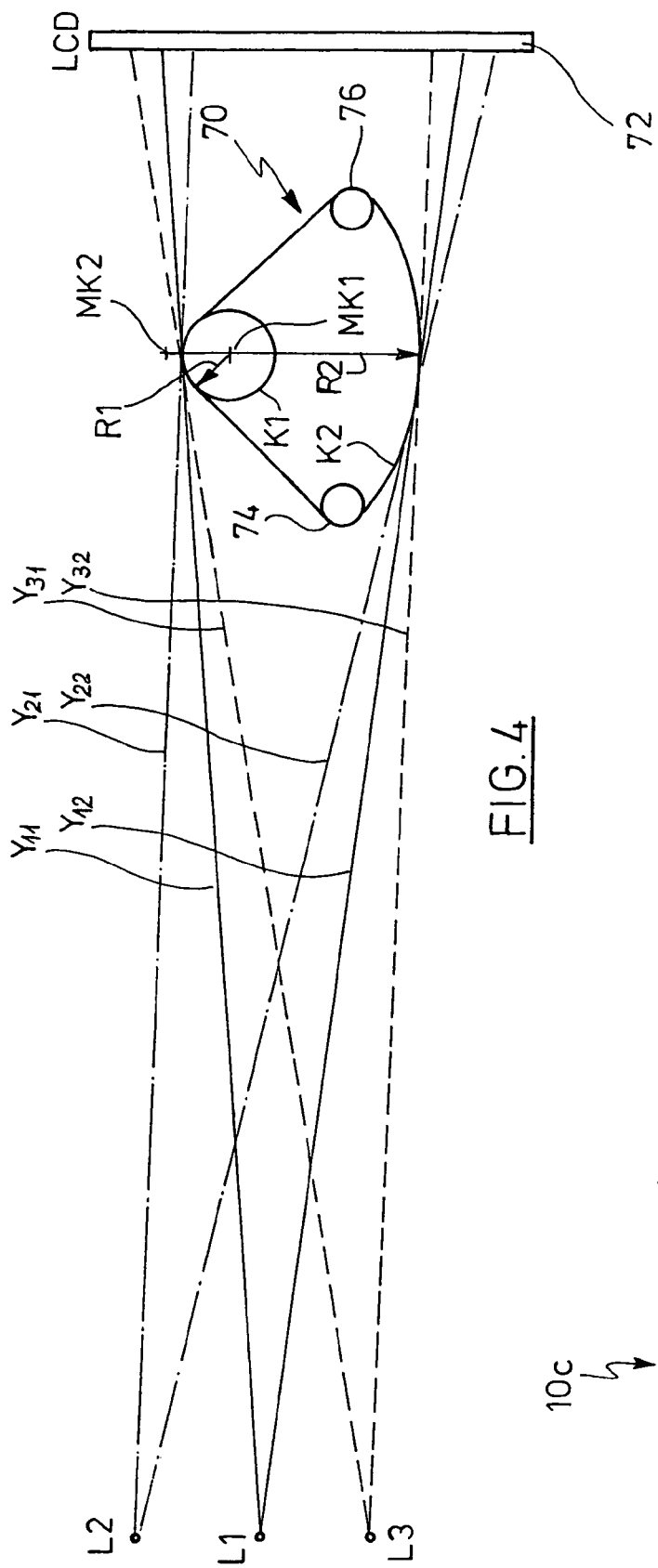
FIG. 4 shows a sector cable in cross-section illuminated by three point-shaped light sources and FIG. 5 shows a rectangular cross-section for example of a flat cable having rounded corners.

In FIG. 4 the cross-section of a so-called sector cable 70 is indicated. Its longitudinal axis extends perpendicular to the drawing plane. In the cross-section two oppositely located circles K1 and K2 on the outer and the inner side of the cross-section with associated radii R1 and R2 and associated centres MK1 and MK2 can be recognized. The cable 70 is illuminated by point-shaped light sources L1 to L3, which are arranged in the same plane as the shown cross-section. On the opposite side of the cable for example a CCD-sensor line 72 is located. In FIG. 4 furthermore tangents $Y_{11}$ to $Y_{32}$ are indicated which result upon the illumination of the sector cable 70 and which define border shadows on CCD-line 72. By means of these tangents which are calculated in a manner shown in connection with FIGS. 1 and 2, the position of the centres MK1 and MK2 can be determined and the radii R1 and R2 of the associated circles as well. In this manner, the height or the thickness of the sector cable can be calculated from the equation R2+R2−(MK2−MK1).

In the shown cross-section the circular sections 74, 76 are at the ends of the circular section K1. By illumination of the sector cable 70 in a direction perpendicular to the illumination by light sources L1 to L3 with three further light sources also the width of sector cable 70 can be measured. This is not shown in FIG. 4.

In order to avoid that possible movements or vibrations of the cables in the arrangements of FIGS. 1 to 4 affect the measurement, the laser diodes either must be activated contemporarily or in extremely short time distances one after the other. Within these intervals, it is not possible to readout sensor lines or CCD-lines, respectively. Therefore, each sensor line may consist of three parallel sub-lines which are sensitive for different spectral colours. Each light source emits a light in a spectral colour for which a sub-line is sensitive. In this case, a contemporary illumination of the cable through our light sources can take place, so that a measurement of the cable takes place on a single location of the cable. Alternatively it is conceivable to provide a shutter for each of the three sub-lines of each sensor line and to open only one sub-line in synchronisation with the activation of the light sources. The activation of the three sub-lines can take place in a microsecond interval. The reading-out of the sensor lines which needs a longer time can take place later on. In this manner the measuring locations on the cable to be measured can be very near so that vibrations and other changes of the position of the cable do not disturb the measurement. In the last alternative embodiment colour filters in combination with respective coloured light sources can be omitted. Simple pulse controlled laser diodes with an emission in the near infrared range can be used.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for measurement of dimensions of an elongated article in a measuring plane perpendicular to the article, the article having a cross-section, the cross-section having a circumference, the article having a longitudinal axis and a non-circular cross-section, the circumference of the cross-section of the article, respectively having sections which are circular and elliptical, the circular cross-section having a centre and a radius, the elliptical cross-section having a centre and a large and a small radii, the measurement taking place along at least an axis of the cross-section, the method comprising the following steps:

the article is illuminated in the measuring plane approximately perpendicular to the longitudinal axis by spaced light sources, the light sources being stationary with respect to the article, the number and the position of the light sources being such that per circular section at least three different peripheral rays and per elliptical section at least four different peripheral rays are generated;

the peripheral rays impinge at least one light sensitive, position resolving sensor;

coordinates of the position of the light sources and of at least one light sensor in a coordinate system in the measuring plane are stored in a memory of a measuring device;

the coordinates of the position on the sensor where the rays impinge the sensor are determined;

position data of the centres of the circular and elliptical sections and data of the radius of the circular sections and of the large and the small radii of the elliptical sections are calculated from the coordinates of the impinging positions and of the light sources using geometrical equations;

at least one dimension of the cross-section of the article is determined from the calculated data;

at least one of the determined dimensions is stored in the memory of the measuring device; and using the determined dimensions in an electronic control to control the dimensions of the article.

2. The method of claim 1, wherein using a plurality of groups of light sources corner positions, circular or elliptical sections of the article are illuminated, each group being associated with a light sensitive position resolving sensor.

3. A method of claim 1, wherein the article is moved in the measuring angle such that the transverse axis of the cross-section is angular to each measuring axis.

4. The method of claim 3, wherein the angle is approximately 45°.

5. The method of claim 1, wherein the impinging positions or the shadow borders, respectively, are determined by the evaluation of intensity courses of diffraction pattern caused by the circular sections or the elliptical sections or the corners.

6. The method of claim 1, wherein the light sources are point-shaped laser light sources.

7. The method of claim 1, wherein the light sources have fan-shaped beams without the use of optical systems.

8. The method of claim 1, wherein position resolving sensors are light sensitive sensor lines, in particular CCD or CMOS-line sensors.

9. The method of claim 8, wherein each sensor line consists of a plurality of parallel sub-lines which selectively are sensitive for a spectral colour and the light sources emit light in one of the spectral colours.

10. The method of claim 8, wherein each sensor line consists of a plurality of parallel sub-lines, Each sub-line has an electronically controlled shutter, the actuation of the shutter is synchronized with a pulse-like activation of the light sources such that upon an activation of the light sources, the shutters are subsequently opened for a short time.

11. The method of claim 1, characterized by its application to flat cables the cross-sections thereof at the short sides the sections are selected from the group consisting of circular and elliptical sections.

12. The method of claim 1, characterized by its application to sector cables.

13. A method for the measurement of the dimension of an elongated article having a longitudinal axis and a cross-section with none-rounded corners, the measurement taking place in a measuring plane transverse to the longitudinal axis, at least one axis of the cross-section in the measuring plane, the method comprising the following steps:

the article is illuminated by a minimum of spaced light sources approximately perpendicular to the longitudinal axis such that per corner at least two different peripheral rays are generated;

the coordinates in a coordinate system in the measurement plane of the light sources and of at least one light sensitive position resolving sensor onto which the peripheral rays impinge are stored in a memory of a measuring device;

the coordinates of the impinging positions of the peripheral rays on the sensor are determined;

the position data of the corners are calculated from the coordinates of the impinging positions and of the light sources by means of geometrical equations; and at least one dimension of the cross-section is determined from the calculated data; and at least one of the determined dimensions is stored in the memory of the measuring device.

14. A method to measure the dimension of an elongated article axially symmetrical in cross-section in a measuring plane, the article having a cross-section, the cross-section having a circumference, the article having a longitudinal axis and rounded corners in cross-section, the corners being defined by circular and elliptical sections, the method comprising the following steps:

the article is illuminated in the measuring plane approximately perpendicular to the longitudinal axis by spaced light sources, the light sources being stationary with respect to the article, the number and the position of the light sources being such that per circular section at least two different peripheral rays and per elliptical section at least three different peripheral rays are generated;

the peripheral rays impinge at least one light sensitive, position resolving sensor;

coordinates of the position of the light sources and of at least one light sensor in a coordinate system in the measuring plane are stored in a memory of a measuring device;

the position data of the centres of the circular and elliptical sections and the radius of the circular sections and the larger and smaller radii of the elliptical sections are calculated from the coordinates of the impinging positions and of the light sources by-means-of using geometric equations and additionally by assumptions resulting from the axial symmetry;

at least one dimension of the cross-section is calculated from the calculated data;

at least one of the determined dimensions is stored in the memory of the measuring device; and using the determined dimensions in an electronic control to control the dimensions of the article.

15. A method for measuring dimensions of an elongated article, comprising the steps of:

providing an elongated article, the article having a non-circular cross-section, the cross-section having a circumference, the article having a longitudinal axis, the circumference of the cross-section of the article having sections selected from the group consisting of circular and elliptical, the circular cross-section having a centre and a radius, and the elliptical cross-section having a centre and large and small radii;

illuminating the article in a measuring plane which is substantially perpendicular to the longitudinal axis of the article with spaced light sources, the light sources being stationary with respect to the article, the number and the position of the light sources being such that per circular section at least three different peripheral rays and per elliptical section at least four different peripheral rays are generated;

impinging at least one light sensitive position resolving sensor with the peripheral rays;

storing the coordinates of the position of the light sources and of the at least one light sensor in a memory of a measuring device;

determining the coordinates of the position where the rays impinge the sensor;

calculating the position of the centres of the circular and elliptical sections and the radius of the circular sections and of the large and the small radii of the elliptical sections, from the coordinates of the impinging positions and of the light sources, using geometrical equations;

determining at least one dimension of the cross-section of the article from the calculated positions and radii; and at least one of the determined dimensions is stored in the memory of the measuring device.

16. A method of manufacturing an elongated structure comprising the steps of:

establishing one or more desired dimensions for an elongated structure to be manufactured;

providing at least one elongated article, the article having a non-circular cross-section, the cross-section having a circumference, the article having a longitudinal axis, the circumference of the cross-section of the article having sections selected from the group consisting of circular and elliptical, the circular cross-section having a centre and a radius, and the elliptical cross-section having a centre and large and small radii;

illuminating the article in a measuring plane which is substantially perpendicular to the longitudinal axis of the article with spaced light sources, the light sources being stationary with respect to the article, the number and the position of the light sources being such that per circular section at least three different peripheral rays and per elliptical section at least four different peripheral rays are generated;

impinging at least one light sensitive position resolving sensor with the peripheral rays;

storing the coordinates of the position of the light sources and of the at least one light sensor in a memory of a measuring device;

determining the coordinates of the position where the rays impinge the sensor; calculating the position of the centres of the circular and elliptical sections and the radius of the circular sections and of the large and the small radii of the elliptical sections, from the coordinates of the impinging positions and of the light sources, using geometrical equations;

determining at least one dimension of the cross-section of the article from the calculated positions and radii;

at least one of the determined dimensions is stored in the memory of the measuring device;

using the determined dimensions in an electronic control to control the dimensions of the article;

positioning the one or more articles to define an elongated structure; and modifying at least one dimension of the determined dimension of the cross-section of the article to correspond with the desired dimensions of the elongated structure.

17. The method of claim 16 in which the elongated structure is a cable.

18. The method of claim 16 in which at least one of the one or more elongated articles is one or more wires.

19. The method of claim 16 in which the step of positioning the one or more articles to define the elongated structure comprises winding the one or more wires together to form one or more figure eight arrangements.

20. The method of claim 16 in which at least one cross section of the desired dimensions of the elongated structure is a shape selected from the list consisting of: circular, elliptical, rounded edged, rectangular, flattened, and any combination thereof.

* * * * *